(12) United States Patent
Xia et al.

(10) Patent No.: US 10,811,188 B2
(45) Date of Patent: Oct. 20, 2020

(54) METAL MATRIX COMPOSITE WIRE, POWER INDUCTOR, AND PREPARATION METHODS FOR SAME

(71) Applicant: Shenzhen Sunlord Electronics Co., Ltd., Shenzhen, Guangdong (CN)

(72) Inventors: Shengcheng Xia, Guangdong (CN); Youyun Li, Guangdong (CN)

(73) Assignee: Shenzhen Sunlord Electronics Co., Ltd., Shenzhen, Guangdong (CN)

( * ) Notice: Subject to any disclaimer, the term of this patent is extended or adjusted under 35 U.S.C. 154(b) by 297 days.

(21) Appl. No.: 15/865,291

(22) Filed: Jan. 9, 2018

(65) Prior Publication Data

US 2018/0130600 A1 May 10, 2018

Related U.S. Application Data

(63) Continuation of application No. PCT/CN2016/080372, filed on Apr. 27, 2016.

(51) Int. Cl.
| | |
|---|---|
| *H01F 41/076* | (2016.01) |
| *H01B 13/06* | (2006.01) |
| *H01F 41/064* | (2016.01) |
| *H01F 41/02* | (2006.01) |
| *C03C 14/00* | (2006.01) |
| *H01F 41/12* | (2006.01) |

(Continued)

(52) U.S. Cl.
CPC ......... *H01F 41/076* (2016.01); *B05D 3/0254* (2013.01); *B05D 3/12* (2013.01); *C03C 8/16* (2013.01); *C03C 14/008* (2013.01); *H01B 3/08* (2013.01); *H01B 7/02* (2013.01); *H01B 13/06* (2013.01); *H01B 13/065* (2013.01); *H01F 27/255* (2013.01); *H01F 27/2823* (2013.01); *H01F 27/292* (2013.01); *H01F 41/0206* (2013.01); *H01F 41/0246* (2013.01); *H01F 41/06* (2013.01); *H01F 41/064* (2016.01); *H01F 41/127* (2013.01); *C03C 2207/02* (2013.01); *C03C 2214/12* (2013.01)

(58) Field of Classification Search
CPC .. H01F 41/076; H01F 41/127; H01F 41/0206; H01B 3/08; H01B 13/065; C03C 14/008
See application file for complete search history.

(56) References Cited

FOREIGN PATENT DOCUMENTS

| CN | 101490769 | 7/2009 |
|---|---|---|
| CN | 101857724 A | 10/2010 |

(Continued)

*Primary Examiner* — Livius R. Cazan
(74) *Attorney, Agent, or Firm* — Winston Hsu

(57) ABSTRACT

A preparation method for a metal matrix composite wire includes the following steps: 1) preparing a metal inner core; 2) preparing a glass-resin mixture; 3) dissolving self-adhesive resin in a solvent to prepare a self-adhesive resin solution; 4) uniformly coating the glass-resin mixture on a surface of the metal inner core, then coating the self-adhesive resin solution on a surface of the glass-resin mixture, and performing drying at a temperature of 80° C. to 150° C.; and 5) repeating the step 4) until a thickness of the glass-resin mixture plus the self-adhesive resin reaches 2 to 10 μm. When an inductor is prepared by using the composite wire, the inductor may have relatively good weather resistance, a relatively good dielectric voltage-withstand capability, as well as relatively good high-temperature resistance and electrical performance.

10 Claims, 2 Drawing Sheets

(51) Int. Cl.
*H01B 3/08* (2006.01)
*H01F 27/255* (2006.01)
*B05D 3/02* (2006.01)
*B05D 3/12* (2006.01)
*C03C 8/16* (2006.01)
*H01B 7/02* (2006.01)
*H01F 27/28* (2006.01)
*H01F 27/29* (2006.01)
*H01F 41/06* (2016.01)

(56) References Cited

FOREIGN PATENT DOCUMENTS

| | | |
|---|---|---|
| CN | 102354576 A | 2/2012 |
| CN | 102354584 A | 2/2012 |
| CN | 104091630 A | 10/2014 |
| JP | S53-16758 | 2/1978 |
| JP | H3-192608 | 8/1991 |
| JP | 2009235216 A | 10/2009 |

METAL MATRIX COMPOSITE WIRE, POWER INDUCTOR, AND PREPARATION METHODS FOR SAME

CROSS REFERENCE TO RELATED APPLICATIONS

This application is a continuation application of PCT/CN2016/080372, filed on Apr. 27, 2016. The contents of PCT/CN2016/080372 are all hereby incorporated by reference.

BACKGROUND OF THE INVENTION

1. Field of the Invention

The present invention relates to a preparation process for a power inductor, and in particular, to a metal matrix composite wire, a power inductor, and preparation methods for same.

2. Description of the Related Art

Currently, for a high-temperature-resistant insulated wire, a mesoporous inorganic oxide layer is usually formed by coating an inorganic oxide on a surface of a conductor. On one hand, if the inorganic oxide layer is coated too densely, the inorganic coating layer is likely to fall off during winding due to brittleness of the inorganic oxide layer. On the other hand, if the inorganic oxide layer is not densely coated, moisture resistance and weather resistance are relatively poor. In addition, manufacturing costs of coating the mesoporous inorganic oxide layer on the surface of the conductor are quite high, and after a power inductor is prepared by using an insulated wire coated by a mesoporous inorganic oxide layer, a dielectric voltage-withstand capability of the inductor is not high due to existence of mesopores, and the voltage that the inductor can withstand is approximately 50 V; the weather resistance of the inductor is also poor, and usually, a copper wire in the mesopores is obviously corroded after a salt-fog test is performed for 4 H. Currently, there is also an insulated wire with a surface coated by an organic material, but a power inductor prepared by using such a wire also has the problem of a low dielectric voltage-withstand capability. In addition, currently, either a wire coated by an inorganic oxide or a wire coated by an organic material has the disadvantage of poor resistance to high temperature.

SUMMARY OF THE INVENTION

The technical problem to be solved by the embodiments of the present application is: to overcome the foregoing disadvantages of the prior art, to provide a metal matrix composite wire, a power inductor, and preparation methods for same, where the inductor prepared by using the composite wire may have relatively good weather resistance, a relatively good dielectric voltage-withstand capability, as well as relatively good high-temperature resistance and electrical performance.

The technical problem of the embodiments of the present application is solved by using the following technical solutions:

A preparation method for a metal matrix composite wire comprises the following steps: 1) preparing a metal inner core; 2) preparing a glass-resin mixture: pre-mixing borosilicate glass powder having a particle size of 300 nm to 2.5 µm and a sintering temperature of 600° C. to 900° C. with a solvent, uniformly stirring the borosilicate glass powder and the solvent, and then adding a dispersant and resin having a decomposition temperature of 300° C. to 500° C., and performing uniform stirring, where the resin is a resin solution having a solid content of 10% to 30%, a mass ratio of the borosilicate glass powder to the resin ranges from 1:10 to 2:10, and a mass fraction of the dispersant to the glass-resin mixture ranges from 0.1% to 0.5%; 3) dissolving self-adhesive resin in a solvent to prepare a self-adhesive resin solution; 4) uniformly coating the glass-resin mixture on a surface of the metal inner core, then coating the self-adhesive resin solution on a surface of the glass-resin mixture, and performing drying at a temperature of 80° C. to 150° C., to ensure that a thickness of the glass-resin mixture plus the self-adhesive resin on the surface of the metal inner core after the coating ranges from 1 to 2 µm; and 5) repeating the step 4) until a thickness of the glass-resin mixture plus the self-adhesive resin reaches 2 to 10 µm.

Preferably, in the step 2), a molecular weight of the resin ranges from 5000 to 50000.

Preferably, the resin is nylon.

Preferably, in the step 2), a particle size of the borosilicate glass powder ranges from 500 nm to 1 µm.

Preferably, in the step 3), the self-adhesive resin is nylon.

Preferably, in the step 1), the metal inner core is a nickel coated copper wire.

A metal matrix composite wire prepared according to the preparation method stated above is provided.

A preparation method for a power inductor comprises the following steps: 1) preparing a metal matrix composite wire according to the preparation method stated above; 2) winding the metal matrix composite wire into a coil with a set shape and a set number of turns, placing the coil into a mold cavity, adding magnetic powder, and pressing the coil and the magnetic powder into an integrally-formed inductor by means of pressure; 3) performing sintering at a temperature of 600° C. to 900° C. to decompose self-adhesive resin in the coil and sinter a glass-resin mixture in the coil into a glass layer; 4) grinding and polishing the metal matrix composite wire exposed on two ends of a magnet of the inductor, and removing the glass layer in the coil to expose a metal inner core inside; and 5) forming a terminal electrode on the metal inner core exposed on the two ends of the magnet of the inductor, to finally obtain the power inductor.

Preferably, in the step 3), sintering is performed in an atmosphere having an oxygen content of lower than or equal to 15%.

A power inductor prepared according to the preparation method stated above is provided.

Compared with the prior art, the embodiments of the present application may have the following beneficial effects:

The preparation method for a metal matrix composite wire of the embodiments of the present application comprises steps such as preparing a metal inner core, coating a specific glass-resin mixture and a self-adhesive resin solution, and drying, so that in the prepared metal matrix composite wire, a surface of the metal inner core is coated by the glass-resin mixture and self-adhesive resin. When the composite wire is used to prepare a power inductor, first, the composite wire and magnetic powder are pressed, and then sintering is performed at a temperature of 600° C. to 900° C.; during the sintering, the self-adhesive resin is decomposed, and the glass-resin mixture is sintered into a glass layer. Because the glass layer has relatively high weather resistance and a relatively high dielectric voltage-withstand capability, and may resist standard salt fog for a period longer than or equal to 8 H and withstand a voltage higher than or equal to 100 V, the prepared power inductor may have relatively good weather resistance and a relatively good dielectric voltage-withstand capability. The glass layer is formed by means of sintering at a temperature of 600° C. to 900° C., and therefore, the power inductor is high-temperature-resistant. In addition, during the preparation, pressing is first performed, and then sintering is performed to form the glass layer. Therefore, during the pressing, a relatively large pressure may be withstood, and damage to the resin mixture and the self-adhesive resin in the composite wire does not need to be worried about. Therefore, the prepared power inductor may have relatively high magnet density, so that both a magnetic permeability and a saturation flux may also be relatively high. Therefore, the power inductor may have relatively good electrical performance.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
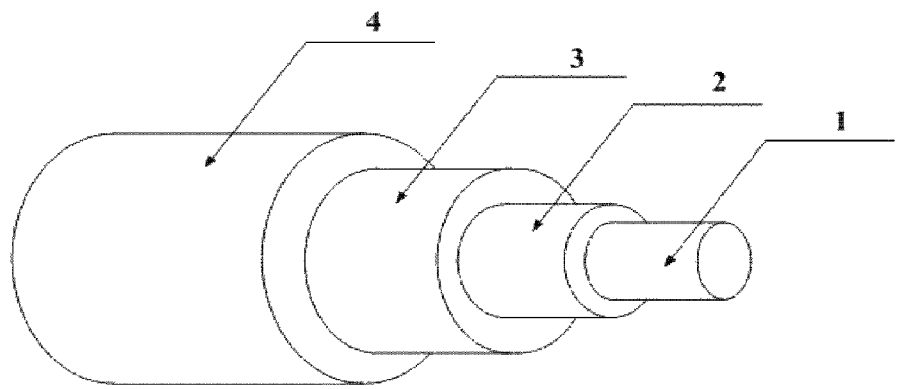
FIG. 1 is a schematic structural diagram of a composite wire prepared in an embodiment of the present application.

The present application is further described in detail below with reference to embodiments and the accompanying drawings.

In the present embodiment, a preparation method for a metal matrix composite wire is provided, to overcome the difficult problem that a conventional insulated wire cannot be applied to manufacturing of a magnetic component due to disadvantages such as poor winding ability, poor weather resistance, high costs, and poor resistance to high temperature. The preparation method for a composite wire of the present embodiment comprises the following steps.

1) Prepare a metal inner core. The metal inner core may be a silver wire, an aluminum wire, or a nickel coated copper wire, and preferably, a nickel coated copper wire. The copper wire has relatively ideal costs and tensile strength, and has a highest price-performance ratio. A nickel coating on a surface has a characteristic of high-temperature resistance in air, and has high wearability, and may implement a function of protecting a body of the copper wire when subsequent high-temperature treatment is needed. The copper wire may be coated by nickel by means of electroplating or chemical plating, and a thickness of the nickel coating is controlled to range from 1/10 to 3/10 of a wire diameter of the copper wire.

2) Prepare a glass-resin mixture: pre-mixing borosilicate glass powder having a particle size of 300 nm to 2.5 µm and a sintering temperature of 600° C. to 900° C. with a solvent, uniformly stirring the borosilicate glass powder and the solvent, and then adding a dispersant and resin having a decomposition temperature of 300° C. to 500° C., and performing uniform stirring, where the resin is a resin solution having a solid content of 10% to 30%, a mass ratio of the borosilicate glass powder to the resin ranges from 1:10 to 2:10, and a mass fraction of the dispersant to the glass-resin mixture ranges from 0.1% to 0.5%.

In this step, the prepared glass-resin mixture is a main component of a glass layer formed by means of subsequent sintering, and is a key factor that affects a subsequent process and performance of the prepared product. The glass powder is B and Si glass powder that has sintering behavior, and is prepared into the glass-resin mixture after being mixed with the resin having a decomposition temperature of 300° C. to 500° C., to facilitate subsequent coating, and a thickness of the coating may be controlled to be relatively small. A particle size of the glass powder is in a range of 300 nm to 2.5 µm, so that not only aggregation can be avoided, but also compatibility with the resin and a dispersing effect are relatively good, and uniformity of the coating is also higher. Preferably, glass powder having a particle size that is in a range of 500 nm to 1 µm is selected. In this way, in the formed glass-resin mixture, dispersibility of the glass powder in the resin is relatively good, and may be relatively easily and uniformly coated during coating. When the mixture formed according to this formula is sintered in a subsequent preparation process for a power inductor, the glass powder may be relatively well sintered to form a glass layer, and the resin is decomposed and volatilized.

Preferably, a molecular weight of the resin ranges from 5000 to 50000, so that the prepared resin mixture may have better paintability, and the coating may have high adhesion. Further, preferably, nylon having a molecular weight of 5000 to 50000 may be selected, and has relatively low costs and relatively good binding performance.

Dissolve self-adhesive resin in the a solvent to prepare a self-adhesive resin solution. The self-adhesive resin is made from nylon, and has low costs as well as a good effect.

4) Uniformly coat the glass-resin mixture on a surface of the metal inner core, then coat the self-adhesive resin on a surface of the glass-resin mixture, and perform drying at a temperature of 80° C. to 150° C., to ensure that a thickness of the glass-resin mixture plus the self-adhesive resin on the surface of the metal inner core after the coating ranges from 1 to 2 µm.

5) Repeat the step 4), until a thickness of the glass-resin mixture plus the self-adhesive resin reaches 2 to 10 µm.

In the foregoing steps, the coated glass-resin mixture forms the glass layer after the subsequent sintering, and the coated self-adhesive resin implements a function of binding and a function of fixing a shape of the entire coating layer. When the insulation layer is coated, a thinner insulation layer indicates that a metal inner core having a relatively larger cross sectional area can be selected, so that resistance is low. However, if the thickness is excessively small, a dielectric voltage-withstand value is relatively low, which is disadvantageous to improvement of a dielectric voltage-withstand capability of the inductor. Based on the above, selection of a thickness of 2 to 10 µm for the coating can comprehensively ensure the electrical performance and the dielectric voltage-withstand capability of the inductor. In the present embodiment, a final required thickness is achieved by means of coating-drying for a plurality of times, a thickness of each time of coating is controlled to range from 1 to 2 µm, and the drying temperature is controlled to range from 80° C. to 150° C. After a glass-resin layer coated wire is subsequently sintered at a temperature of 600° C. to 900° C., a dense glass layer having a thickness of 2 to 10 µm is formed on a surface of the nickel coated copper wire. By means of coating-drying for a plurality of times, uniformity of the coating and controllability of a thickness of the coating can be ensured. After the sintering, the formed glass layer may have relatively high weather resistance and a relatively high dielectric voltage-withstand capability, and may resist standard salt fog for a period longer than or equal to 8 H and withstand a voltage higher than or equal to 100 V.

The schematic structural diagram of the foregoing prepared metal matrix composite wire is shown in FIG. 1. The metal matrix composite wire comprises a metal inner core (copper 1 and a nickel coating 2), a glass-resin mixture 3 and a self-adhesive resin layer 4. The metal matrix composite wire may be used to prepare a magnetic component.

Figure 2:
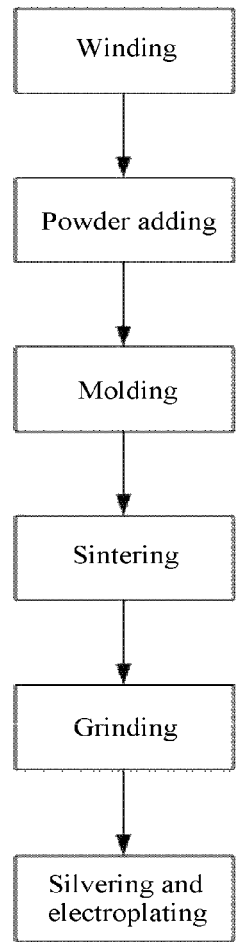
FIG. 2 is a flowchart of a preparation method for a power inductor according to an embodiment of the present application.

As shown in FIG. 2, FIG. 2 is a flowchart of preparing a power inductor by using a metal matrix, comprising the following steps: First, a composite wire of the present embodiment is wound into a coil with a specified shape and a specified number of turns. Next, the coil is placed into a mold cavity, metal soft magnetic powder is added, and the magnetic powder and the coil are pressed into one piece by means of pressure. Then, sintering is performed at a high temperature of 600° C. to 900° C. to decompose self-adhesive resin in the coil and sinter a glass-resin mixture in the coil into a glass layer. Subsequently, a part, exposed out of a magnet, of the coil is polished by means of grinding and the glass layer in the coil is removed to expose a metal inner core inside. Finally, a terminal electrode is formed by means of silvering and electroplating processes, to finally form a surface-mounted power inductor.

Figure 3:
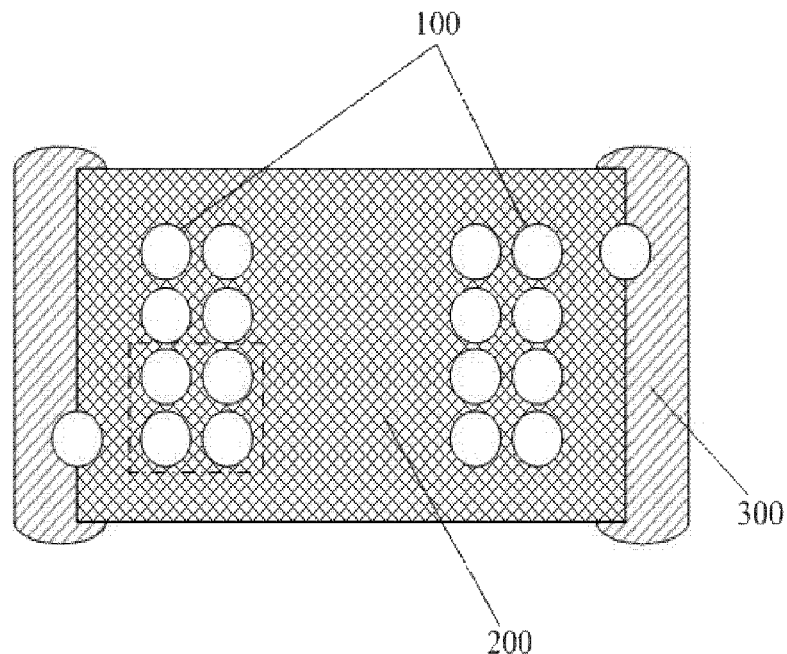
FIG. 3 is a schematic sectional view of a power inductor prepared in an embodiment of the present application.
Figure 4:
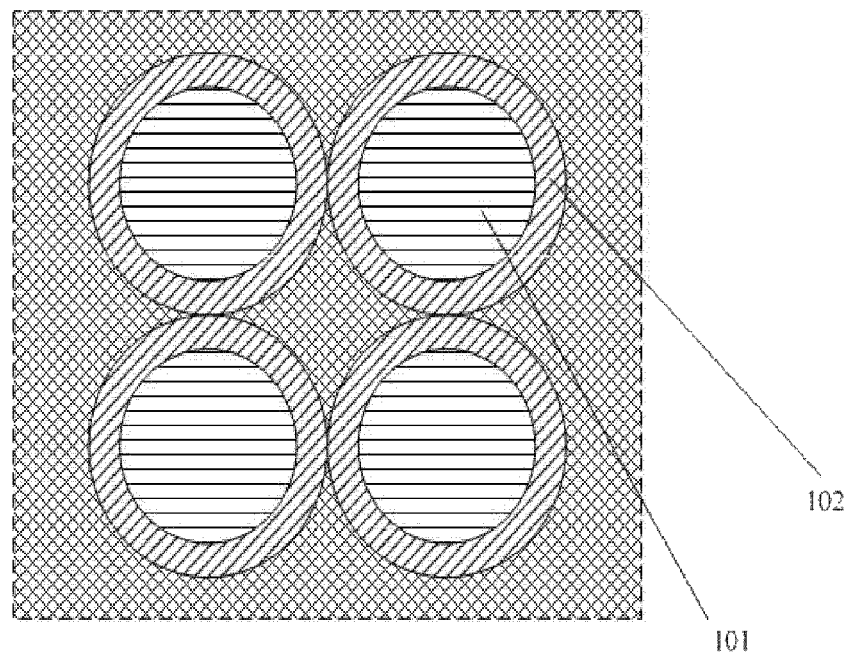
FIG. 4 is a partial enlarged schematic diagram of a power inductor prepared in an embodiment of the present application.

As shown in FIG. 3, FIG. 3 is a schematic sectional view of the prepared power inductor. The inductor comprises a coil 100 formed by sintering the wounded metal matrix composite wire, a magnet 200 formed by pressing the metal soft magnetic powder, and a terminal electrode 300. FIG. 4 is a partial enlarged schematic diagram of a dashed portion in FIG. 3. The composite wire is wound into the coil. The self-adhesive resin in the composite wire is carbonized and oxidized in the sintering process at a high temperature of 600° C. to 900° C., and then is decomposed to form gases for discharge. A glass-resin layer in the composite wire forms a glass layer 102 after being sintered at the high temperature of 600° C. to 900° C., and main components of the glass layer 102 are B and Si. 101 in the figure represents the metal inner core in the composite wire. Because the glass layer 102 has relatively high weather resistance and insulation characteristics, there is a relatively high dielectric voltage-withstand capability between layers of the coil (between two adjacent metal inner cores 101).

The power inductor of the present embodiment may overcome a contradiction between electrical performance and a voltage-withstand capability of a conventional "integrally-formed inductor". The electrical performance of the "integrally-formed inductor" mainly depends on the magnet 200. For a same material, a magnetic permeability and a saturation flux of the magnet 200 are positively correlated with the density of the magnet. In the preparation process, a method for increasing the density is to increase forming pressure. However, a conventional coil is made of a polyurethane enameled wire, and cannot withstand relatively high forming pressure. In an extrusion process, a paint film is easily broken. Finally and consequently, a dielectric voltage-withstand capability between layers of the coils in the prepared inductor is low, even a short circuit may occur, and the dielectric voltage-withstand performance of the prepared inductor is relatively low. However, in the present embodiment, when the power inductor is prepared by using the composite wire coated by glass-resin, pressing is first performed, and then sintering is performed, where states of the glass-resin layer in different phases are skillfully used. During the pressing, the glass-resin and the self-adhesive resin are pressed and may withstand relatively large pressure, and damage to the resin mixture and the self-adhesive resin does not need to be worried about. Therefore, the power inductor prepared by means of pressing may have relatively high magnet density, so that both a magnetic permeability and a saturation flux may also be relatively high. Therefore, the power inductor may have relatively good electrical performance. After the sintering at the high temperature of 600° C. to 900° C., the glass-resin mixture is sintered to form the glass layer having high weather resistance and voltage-withstand characteristics. Insulation is formed by using the glass layer between layers of the coils, and insulation performance is relatively good. The coil in the inductor is formed by the sintering at a temperature of 600° C. to 900° C., and therefore the coil has high-temperature resistance itself, so that the subsequent manufacturing of the terminal electrode may be completed by means of spot welding and silver burning processes, which are simple and convenient and have relatively low costs. In addition, during application, the coil may also be applied to a high-temperature environment. Based on the above, the novel power inductor of the present embodiment is used to overcome a conventional contradiction between forming density and voltage withstanding, may have higher electrical performance, higher dielectric voltage-withstand performance and high-temperature resistance.

Preferably, sintering is performed in an atmosphere having an oxygen content of lower than or equal to 15%. In this way, the metal matrix, such as a nickel coated copper wire, may be prevented from being oxidized in the process of sintering the glass-resin layer, to ensure conductivity of a part of the metal matrix in the coil in the inductor.

The present application is described above in further detail with reference to specific preferred implementations, and it cannot be considered that the embodiments of the present application is limited only to these descriptions. For persons of ordinary skill in the technical field to which the present application belongs, several replacements or obvious transformations that are made on a precondition of not departing from the idea of the present application and have same performance or use should be considered to fall into the protection scope of the present application.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A preparation method for a metal matrix composite wire, comprising the following steps:
   1) preparing a metal inner core;
   2) preparing a glass-resin mixture: pre-mixing borosilicate glass powder having a particle size of 300 nm to 2.5 μm and a sintering temperature of 600° C. to 900° C. with a solvent, uniformly stirring the borosilicate glass powder and the solvent, and then, adding a dispersant and resin having a decomposition temperature of 300° C. to 500° C., and performing uniform stirring, wherein the resin is a resin solution having a solid content of 10% to 30%, a mass ratio of the borosilicate glass powder to the resin ranges from 1:10 to 2:10, and a mass fraction of the dispersant to the glass-resin mixture ranges from 0.1% to 0.5%;
3) dissolving self-adhesive resin in a solvent to prepare a self-adhesive resin solution;
4) uniformly coating the glass-resin mixture on a surface of the metal inner core, then coating the self-adhesive resin solution on a surface of the glass-resin mixture, and performing drying at a temperature of 80° C. to 150° C., to ensure that a thickness of the glass-resin mixture plus the self-adhesive resin on the surface of the metal inner core after the coating ranges from 1 to 2 μm; and
5) repeating the step 4) until a thickness of the glass-resin mixture plus the self-adhesive resin reaches 2 to 10 μm.

2. The preparation method for a metal matrix composite wire according to claim 1, wherein in the step 2), a molecular weight of the resin ranges from 5000 to 50000.

3. The preparation method for a metal matrix composite wire according to claim 2, wherein in the step 2), the resin is nylon.

4. The preparation method for a metal matrix composite wire according to claim 1, wherein in the step 2), a particle size of the borosilicate glass powder ranges from 500 nm to 1 μm.

5. The preparation method for a metal matrix composite wire according to claim 1, wherein in the step 3), the self-adhesive resin is nylon.

6. The preparation method for a metal matrix composite wire according to claim 1, wherein in the step 1), the metal inner core is a nickel coated copper wire.

7. A metal matrix composite wire prepared according to the preparation method of claim 1.

8. A preparation method for a power inductor, comprising the following steps:
1) preparing a metal matrix composite wire according to a preparation method comprising the following steps;
1-1) preparing a metal inner core;
1-2) preparing a glass-resin mixture: pre-mixing borosilicate glass powder having a particle size of 300 nm to 2.5 μm and a sintering temperature of 600° C. to 900° C. with a solvent, uniformly stirring the borosilicate glass powder and the solvent, and then, adding a dispersant and resin having a decomposition temperature of 300° C. to 500° C., and performing uniform stirring, wherein the resin is a resin solution having a solid content of 10% to 30%, a mass ratio of the borosilicate glass powder to the resin ranges from 1:10 to 2:10, and a mass fraction of the dispersant to the glass-resin mixture ranges from 0.1% to 0.5%;
1-3) dissolving self-adhesive resin in a solvent to prepare a self-adhesive resin solution;
1-4) uniformly coating the glass-resin mixture on a surface of the metal inner core, then coating the self-adhesive resin solution on a surface of the glass-resin mixture, and performing drying at a temperature of 80° C. to 150° C., to ensure that a thickness of the glass-resin mixture plus the self-adhesive resin on the surface of the metal inner core after the coating ranges from 1 to 2 μm; and
1-5) repeating the step 1-4) until a thickness of the glass-resin mixture plus the self-adhesive resin reaches 2 to 10 μm;
2) winding the metal matrix composite wire into a coil with a set shape and a set number of turns, placing the coil into a mold cavity, adding magnetic powder, and pressing the coil and the magnetic powder into an integrally-formed inductor by means of pressure; 3) performing sintering at a temperature of 600° C. to 900° C. to decompose self-adhesive resin in the coil and sinter a glass-resin mixture in the coil into a glass layer; 4) grinding and polishing the metal matrix composite wire exposed on two ends of a magnet of the inductor, and removing the glass layer in the coil to expose a metal inner core inside; and 5) forming a terminal electrode on the metal inner core exposed on the two ends of the magnet of the inductor, to finally obtain the power inductor.

9. The preparation method for a power inductor according to claim 8, wherein in the step 3), sintering is performed in an atmosphere having an oxygen content of lower than or equal to 15%.

10. A power inductor prepared according to the preparation method of claim 8.

* * * * *